US012742989B2

(12) United States Patent
Tu et al.

(10) Patent No.: US 12,742,989 B2

(45) Date of Patent: Sep. 22, 2026

(54) ELECTROCHROMIC COMPOSITION, ANTI-PEEP FILM, AND DISPLAY DEVICE

(71) Applicant: TCL CHINA STAR OPTOELECTRONICS TECHNOLOGY CO., LTD., Shenzhen (CN)

(72) Inventors: Siyang Tu, Shenzhen (CN); Hangchuan Zhang, Shenzhen (CN); Lixuan Chen, Shenzhen (CN)

(73) Assignee: TCL CHINA STAR OPTOELECTRONICS TECHNOLOGY CO., LTD., Shenzhen (CN)

( * ) Notice: Subject to any disclaimer, the term of this patent is extended or adjusted under 35 U.S.C. 154(b) by 598 days.

(21) Appl. No.: 18/309,639

(22) Filed: Apr. 28, 2023

(65) Prior Publication Data

US 2024/0219795 A1 Jul. 4, 2024

(30) Foreign Application Priority Data

Dec. 30, 2022 (CN) ........................ 202211739245.7

(51) Int. Cl.
*G02F 1/163* (2006.01)
*C09B 57/00* (2006.01)
(Continued)

(52) U.S. Cl.
CPC .......... *G02F 1/15165* (2019.01); *C09B 57/00* (2013.01); *C09B 67/007* (2013.01);
(Continued)

(58) Field of Classification Search
CPC .... G02F 1/15165; G02F 1/1323; G02F 1/163; G02F 2202/046; C09B 57/00; C09B 67/007; C09K 9/02; C09K 2211/101
(Continued)

(56) References Cited

U.S. PATENT DOCUMENTS

2003/0179432 A1* 9/2003 Vincent .................. G02F 1/155 359/265
2011/0141544 A1 6/2011 Suzuki et al.

FOREIGN PATENT DOCUMENTS

CN 105838350 A 8/2016
CN 108795407 A 11/2018
(Continued)

OTHER PUBLICATIONS

Chinese Office Action issued in corresponding Chinese Patent Application No. 202211739245.7 dated Mar. 19, 2026, pp. 1-9.

*Primary Examiner* — Ruiyun Zhang
(74) *Attorney, Agent, or Firm* — PV IP PC; Peter Stecher; Wei Te Chung

(57) ABSTRACT

An electrochromic composition, an anti-peep film, and a display device are provided. The electrochromic composition includes an acid-sensitive dye, an electrogenic acid, an ionic liquid, and a solvent. The acid-sensitive dye is capable of switching between a transparent state and a colored state in accordance with a change of proton concentration in the electrochromic composition. The electrogenic acid is capable of producing protons under action of external electrons. The ionic liquid is composed of dissociated ions. When the proton concentration of the electrochromic composition is 0, the acid-sensitive dye is in the transparent state. When the proton concentration of the electrochromic composition is greater than 0, the acid-sensitive dye is in the colored state.

20 Claims, 4 Drawing Sheets

(51) Int. Cl.
*C09B 67/20* (2006.01)
*C09K 9/02* (2006.01)
*G02F 1/13* (2006.01)
*G02F 1/1516* (2019.01)

(52) U.S. Cl.
CPC .............. *C09K 9/02* (2013.01); *G02F 1/1323* (2013.01); *G02F 1/163* (2013.01); *C09K 2211/1011* (2013.01); *G02F 2202/046* (2013.01)

(58) Field of Classification Search
USPC .................................................. 428/1.3, 1.31
See application file for complete search history.

(56) References Cited

FOREIGN PATENT DOCUMENTS

| | | | | | |
|---|---|---|---|---|---|
| CN | 108873537 | A | | 11/2018 | |
| CN | 111944108 | A | | 11/2020 | |
| CN | 114015433 | A | * | 2/2022 | ............... C09K 9/02 |

* cited by examiner

ELECTROCHROMIC COMPOSITION, ANTI-PEEP FILM, AND DISPLAY DEVICE

TECHNICAL FIELD

The present application relates to the field of anti-peep technology, and specifically relates to an electrochromic composition, an anti-peep film, and a display device.

BACKGROUND

At present, a mature technology of electronically controlled anti-peep film is to use polymer dispersed liquid crystal (PDLC) to scatter collimated light through a shutter film, so as to realize switching between an anti-peep mode and non-anti-peep mode. In this way, it is necessary to add a PDLC functional layer above the original anti-peep shutter film. At the same time, it is necessary to add a collimating prism film on a backlight module to improve light efficiency, resulting in an extremely complex film structure. A simple design is to replace black spacer units in the conventional shutter film with electrochromic materials capable of switching between a transparent state and a black state. A thickness of the shutter film is generally designed to be greater than 100 μm to achieve anti-peep effect, while traditional electrochromic materials (such as tungsten oxide, amethyst, or polymer) may merely realize film discoloration with the thickness below 10 μm. It is difficult for the traditional electrochromic materials to realize the anti-peep effect.

SUMMARY

The present application provides an electrochromic composition with anti-peep effect, and the anti-peep film and the display device which are simple in structure and have anti-peep effect.

In order to solve above problem, solutions provided by the present application are as follows:

The present application provides an electrochromic composition, including:

an acid-sensitive dye capable of switching between a transparent state and a colored state in accordance with the change of proton concentration in the electrochromic composition;

an electrogenic acid capable of producing protons under an action of external electrons;

an ionic liquid composed of dissociated ions; and a solvent;

the acid-sensitive dye, the electrogenic acid, the ionic liquid, and the solvent are mixed together; when the proton concentration of the electrochromic composition is 0, the acid-sensitive dye is in the transparent state; and, when the proton concentration of the electrochromic composition is greater than 0, the acid-sensitive dye is in the colored state.

In an optional embodiment of the present application, a mass fraction ratio of the acid-sensitive dye, the electrogenic acid, the ionic liquid, and the solvent in the electrochromic composition is (0.1~2):(0.1~2):(2~10):(40~85).

In an optional embodiment of the present application, further including a transparent polymer, the transparent polymer, the acid-sensitive dye, the electrogenic acid, the solvent, and the ionic liquid are mixed together.

In an optional embodiment of the present application, a mass fraction ratio of the acid-sensitive dye, the electrogenic acid, the ionic liquid, the transparent polymer, and the solvent in the electrochromic composition is (0.1~2):(0.1~2):(2~10):(5~50):(40~85).

In an optional embodiment of the present application, the electrochromic composition is in a sol state.

In an optional embodiment of the present application, the solvent in the electrochromic composition accounts for more than 30% by weight of the composition.

In an optional embodiment of the present application, the acid-sensitive dye is a fluorane derivative.

In an optional embodiment of the present application, the electrogenic acid is at least one of hydroquinone and hydroquinone derivatives, benzoquinone and benzoquinone derivatives, and urea derivatives.

In an optional embodiment of the present application, the ionic liquid is a molten salt, and the molten salt refers to a salt that is in a molten state above 0 degrees Celsius; and the ionic liquid is at least one of trifluoromethane sulfonimide, 1-butyl-3-methylimidazole tetrafluoroborate, and 1-butyl-3-methylimidazole hexafluorophosphate.

In an optional embodiment of the present application, the solvent is polycarbonate or acetonitrile.

In an optional embodiment of the present application, the transparent polymer is polymethyl methacrylate or polyvinyl butyral ester.

In an optional embodiment of the present application, the colored state is a gray state or a black state, a light transmittance of the electrochromic composition in the transparent state is greater than a light transmittance of the electrochromic composition in the gray state, and the light transmittance of the electrochromic composition in the gray state is greater than a light transmittance of the electrochromic composition in the black state.

The present application provides an anti-peep film, including: a first electrode layer;

- a second electrode layer disposed opposite to the first electrode layer; and
- an electrochromic layer located between the first electrode layer and the second electrode layer;
- the electrochromic layer includes a substrate and a plurality of electrochromic units embedded in the substrate, and two adjacent electrochromic units are separated by at least a part of the substrate; and,
- each of the plurality of electrochromic units includes an electrochromic composition, and the electrochromic composition includes:

an acid-sensitive dye capable of switching between a transparent state and a colored state in accordance with a change of proton concentration in the electrochromic composition;

- an electrogenic acid capable of producing protons under an action of external electrons;
- an ionic liquid composed of dissociated ions; and
- a solvent;
- the acid-sensitive dye, the electrogenic acid, the ionic liquid, and the solvent are mixed together; and, when the proton concentration of the electrochromic composition is 0, the acid-sensitive dye is in the transparent state; and, when the proton concentration of the electrochromic composition is greater than 0, the acid-sensitive dye is in the colored state.

In an optional embodiment of the present application, further including:

- a first substrate layer located on a side of the first electrode layer away from the electrochromic layer; and
- a second substrate layer located on a side of the second electrode layer away from the electrochromic layer;
- the first electrode layer, the second electrode layer, the substrate, the first substrate layer, and the second substrate layer are all transparent.

In an optional embodiment of the present application, when no voltage is applied between the first electrode layer and the second electrode layer, or a voltage difference between the first electrode layer and the second electrode layer is 0, the electrochromic units are in the transparent state; and, when the voltage difference between the first electrode layer and the second electrode layer is greater than 0, the electrochromic units are in the colored state, and the colored state includes a gray state or a black state.

In an optional embodiment of the present application, the voltage difference between the first electrode layer and the second electrode layer ranges from 0V to 5V.

In an optional embodiment of the present application, a transmittance of the anti-peep film decreases with the voltage difference between the first electrode layer and the second electrode layer increases.

In an optional embodiment of the present application, a thickness of each of the electrochromic units in a stacking direction of the first electrode layer, the electrochromic layer, and the second electrode layer ranges from 100 μm to 150 μm.

In an optional embodiment of the present application, a minimum visible angle of light passing through the anti-peep film is defined as θ, and tan θ-L1/H; and L1 is a distance between the two adjacent electrochromic units, H is the thickness of each of the electrochromic units in the stacking direction of the first electrode layer, the electrochromic layer, and the second electrode layer;

the adjustable visual angle θ of the light passing through the anti-peep film ranges from 0° to 90°.

The present application provides a display device, including a display panel and an anti-peep film located on a light-emitting side of the display panel. The anti-peep film includes:

- a first electrode layer;
- a second electrode layer disposed opposite to the first electrode layer; and
- an electrochromic layer located between the first electrode layer and the second electrode layer;
- the electrochromic layer includes a substrate and a plurality of electrochromic units embedded in the substrate, and two adjacent electrochromic units are separated by at least a part of the substrate; and, each of the plurality of electrochromic units includes an electrochromic composition, and the electrochromic composition includes:
- an acid-sensitive dye capable of switching between a transparent state and a colored state in accordance with a change of proton concentration in the electrochromic composition;
- an electrogenic acid capable of producing protons under an action of external electrons;
- an ionic liquid composed of dissociated ions; and
- a solvent;
- the acid-sensitive dye, the electrogenic acid, the ionic liquid, and the solvent are mixed together; when the proton concentration of the electrochromic composition is 0, the acid-sensitive dye is in the transparent state; and, when the proton concentration of the electrochromic composition is greater than 0, the acid-sensitive dye is in the colored state.

The electrochromic composition provided by the present application includes the acid-sensitive dye, the electrogenic acid, the ionic liquid, and the solvent. When the voltage is applied, the electrogenic acid receives external electrons to take place a redox reaction and releases the protons into the electrochromic composition. The acid-sensitive dye contacts with the protons to take place a color development reaction, so that the electrochromic composition switches from the transparent state to the colored state (the gray state or the black state). The light transmittance of the electrochromic composition in the transparent state is higher, and the light transmittance of the electrochromic composition in the colored state is lower. When the electrochromic composition is used in the anti-peep film, the electrochromic layer in the anti-peep film may be controlled to switch between the colored state and the transparent state, so as to control opening and closing of an anti-peep mode of the anti-peep film by controlling the voltage difference between the first electrode layer and the second electrode layer of the anti-peep film. Specifically, when the anti-peep film is in the colored state, the anti-peep mode is turned on and light with a large angle may be blocked. The anti-peep film in the transparent state may allow the screen light from all angles to pass through the anti-peep film, and the anti-peep mode is turned off. In addition, for the anti-peep film in the present application, since the voltage is applied to control the voltage difference between the first electrode layer and the second electrode layer to turn on the anti-peep film, so that the electrochromic composition of the anti-peep film is controlled to switch between the transparent state and the colored state to control the opening and closing of the anti-peep mode. Therefore, in the present disclosure, it is not necessary to add a PDLC functional layer above the anti-peep film and a collimating prism film on a backlight module. The anti-peep film and the display device have simple structures.

DESCRIPTION OF DRAWINGS

To describe technical solutions of embodiments of the present application more clearly, the following briefly introduces accompanying drawings used in a description of the embodiments of the present disclosure. Apparently, the accompanying drawings described below illustrate only some exemplary embodiments of the present application, and persons skilled in the art may derive other drawings from the drawings without making creative efforts.

DETAILED DESCRIPTION OF EMBODIMENTS

Figure 1:
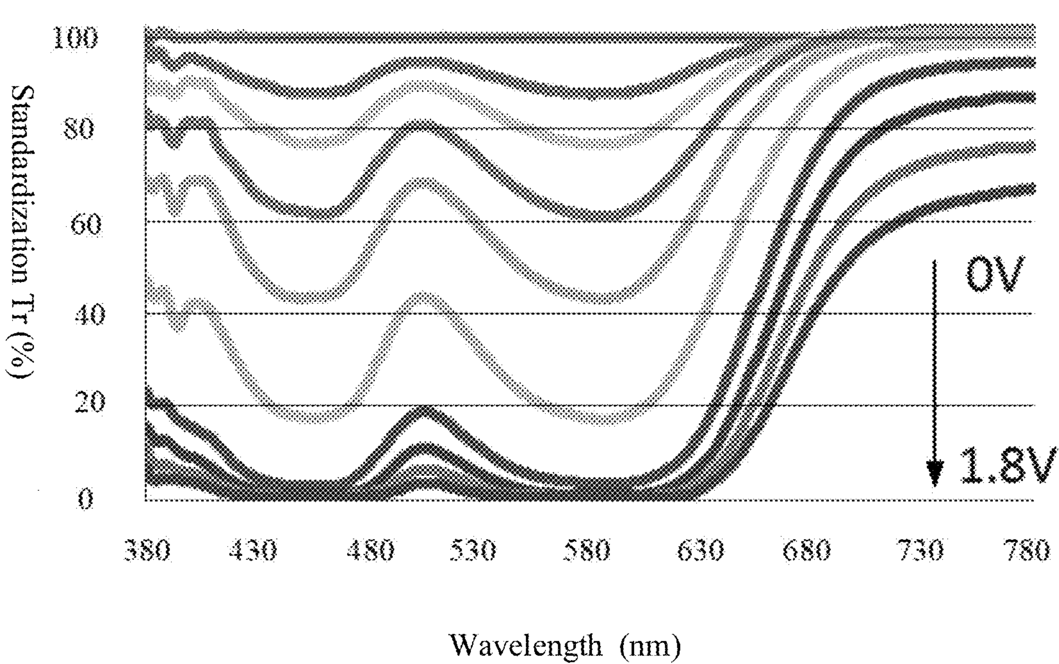
FIG. 1 is a normalized transmittance spectrum of an electrochromic composition provided by the present application under different voltages.

The technical solutions in embodiments of the present application will be described clearly and completely hereafter with reference to the accompanying drawings. Apparently, described embodiments are only a part of but not all embodiments of the present application. All other embodiments obtained by persons of ordinary skill in the art based on the embodiments of the present disclosure without creative efforts shall fall within a protection scope of the present application.

In description of the present application, it should be understood that orientational or positional relationships represented by directional terms mentioned in the present application, such as top and bottom, are orientational or positional relationships based on the drawings, and are merely for the convenience of describing the present application and simplifying the description, rather than indicating or implying that the device or element is intended to have a particular orientation, or is constructed and operated in a particular orientation, and therefore, should not be interpreted as a limitation of the application. In addition, terms such as "first" and "second" are used herein for purposes of description, and should not be interpreted as indication or implication of relative importance, or implied indication of a number of the technical features. Therefore, features limited by terms such as "first" and "second" can explicitly or impliedly include one or more than one of these features. In description of the disclosure, "a plurality of" means two or more than two, unless otherwise specified.

Reference numerals may be repeated in different examples in the present application. This repeating is for the purpose of simplification and clarity and does not refer to relations between different embodiments and/or settings.

An electrochromic composition, an anti-peep film, and a display device provided herein will be described in detail below with reference to specific embodiments and accompanying drawings.

An electrochromic provided by the present application includes an acid-sensitive dye, an electrogenic acid, an ionic liquid, and a solvent. The acid-sensitive dye, the electrogenic acid, the ionic liquid, and the solvent are mixed together.

The acid-sensitive dye is capable of switching between a transparent state and a colored state in accordance with a change of proton concentration in the electrochromic composition. Specifically, the acid-sensitive dye refers to a dye capable of taking place a color development reaction, when a concentration of system protons (H+) changes. The acid-sensitive dye is generally a fluorane derivative. The colored state of the fluorane derivative is black, and a faded state of the fluorane derivative is transparent. The fluorane derivative refers to a compound formed by condensation of phthalic anhydride and phenol.

The electrogenic acid is capable of producing the protons under an action of external electrons. Specifically, the electrogenic acid refers to molecules capable of generating the protons under the action of external electrons, such as hydroquinone and hydroquinone derivatives, benzoquinone and benzoquinone derivatives, urea derivatives, and the like.

The ionic liquid is a liquid which is a molten salt at a certain temperature, and the ionic liquid is composed of dissociated ions without the solvent. The ionic liquid is used to improve an ionic conductivity of the electrochromic composition. The certain temperature refers to a temperature above 0° C. In an embodiment, the certain temperature is room temperature, for example, 25° C., or the like.

Specifically, the ionic liquid is at least one of trifluoromethane sulfonimide ([Bmim][$Tf_2N$]), 1-butyl-3-methylimidazole tetrafluoroborate ([Bmim][$BF_4$]), 1-butyl-3-methylimidazole hexafluorophosphate ([Bmim][$PF_6$]), etc.

The solvent is polycarbonate or acetonitrile.

When the proton concentration of the electrochromic composition is 0, the acid-sensitive dye is in the transparent state; when the proton concentration of the electrochromic composition is greater than 0, the acid-sensitive dye is in the colored state. The colored state is a gray state or a black state. Specifically, whether the colored state is the gray state or the black state, which is further related to a voltage applied.

An electrochromic principle of the electrochromic composition is as follows: when the voltage is applied, the electrogenic acid receives external electrons to take place a redox reaction and releases protons into the electrochromic composition. The acid-sensitive dye contacts with the protons to take place a color development reaction, so that the electrochromic composition switches from the transparent state to the colored state (the gray state or the black state). The light transmittance of the electrochromic composition in the transparent state is higher, and the light transmittance of the electrochromic composition in the colored state is lower. Specifically, the light transmittance of the electrochromic composition in the transparent state is greater than a light transmittance of the electrochromic composition in the gray state, and the light transmittance of the electrochromic composition in the gray state is greater than a light transmittance of the electrochromic composition in the black state.

In an optional embodiment of the present application, the electrochromic composition further includes a transparent polymer. The transparent polymer, the acid-sensitive dye, the electrogenic acid, the solvent, and the ionic liquid are mixed together.

In an optional embodiment of the present application, a mass fraction ratio of the acid-sensitive dye, the electrogenic acid, the ionic liquid, the transparent polymer, and the solvent in the electrochromic composition is (0.1~2):(0.1~2):(2~10):(5~50):(40~85).

In an optional embodiment of the present application, the solvent in the electrochromic composition accounts for more than 30% by weight of the composition in total to keep the electrochromic composition in a sol state.

The transparent polymer is at least one of polymethyl methacrylate (PMMA), polyvinyl butyral (PVB), or the like. In an optional embodiment of the present application, the transparent polymer is polymethyl methacrylate.

The transparent polymer is used as a skeleton of the electrochromic composition for preventing the acid-sensitive dye from agglomerating under the action of an applied electric field. The solvent may be further used as a plasticizer for the transparent polymer to keep the electrochromic composition in the sol state.

If the transparent polymer is not added to the electrochromic composition at all, acid-sensitive dye molecules will be agglomerated after one color development reaction, resulting in that a part of agglomerated acid-sensitive dye molecules are unable to fade and generate black particles. If too much of the transparent polymer is added to the electrochromic composition, the electrochromic composition will be cured into a gel state, resulting in a decrease in a distance of molecule thermal movement in the electrochromic composition, and an electrochromic response under a high film thickness may not be realized. Therefore, it is necessary to adjust a ratio of PMMA to PC to adjust a viscosity of the electrochromic composition, so as to keep the electrochromic composition in the sol state.

In the sol state, the acid-sensitive dye molecules, electrogenic acid molecules, and the protons in the electrochromic composition may realize a long-distance migration under the action of the molecular thermal movement, so that the electrochromic composition may realize electrochromic response under a high film thickness (100 μm to 150 μm).

Referring to FIG. 1, FIG. 1 is a normalized transmittance spectrum of an electrochromic composition provided by the present application under different voltages. As may be seen from FIG. 1, when in an applied voltage state, a light transmittance of the electrochromic composition to visible rays gradually decreases with an increase in voltage, and the electrochromic composition is in the colored state. In this embodiment, the voltage ranges from 0V to 1.8 V. Certainly, the voltage is not limited to 0V-1.8 V, and 0V-1.8 V is merely a preferred voltage. In fact, the voltage may be between 0V and 5V. When the voltage is 0V, the light transmittance of the electrochromic composition is 100%. And when the voltage is 1.8V, the light transmittance of the electrochromic composition is close to 0%, that is, close to the black state. It is clear that for light with different wavelengths, when the voltage is 1.8V, the light transmittance of the electrochromic composition may be greater than 0%, for example, the light transmittance of light with wavelengths of 380 nm-430 nm and 480 nm-580 nm is greater than 0%.

Figure 2:
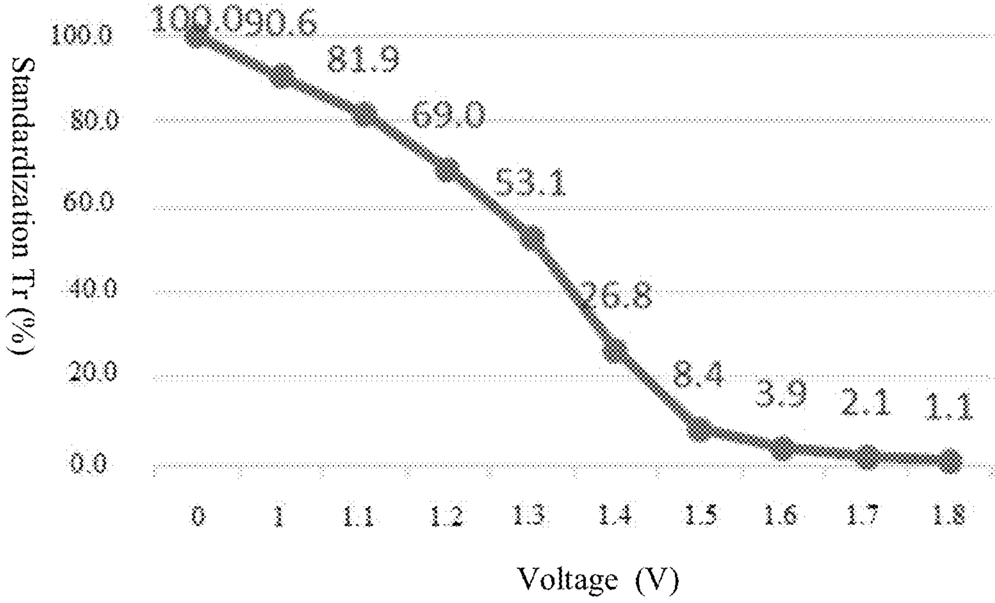
FIG. 2 is a transmission-voltage changing curve of the electrochromic composition provided by the present application.

Referring to FIG. 2, FIG. 2 is a transmission-voltage changing curve of the electrochromic composition provided by the present application. As may be seen from FIG. 2, as the voltage gradually increases from 0V (for example to 1.8 V), the light transmittance of the electrochromic composition gradually decreases from 100% to 0%.

As may be seen from FIG. 1 and FIG. 2, the electrochromic composition is controlled to switch between the transparent state and the colored state (the gray state or the black state) by adjusting the voltage, so as to control the light transmittance of the electrochromic composition.

Figure 3:
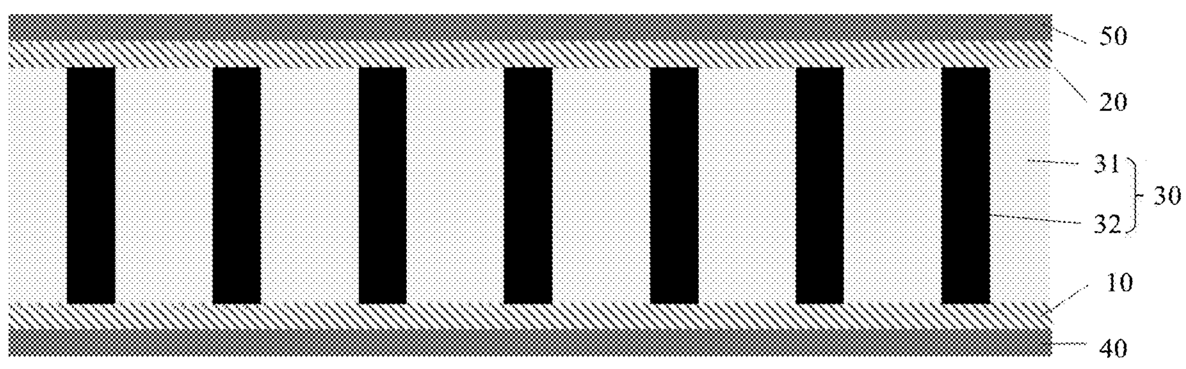
FIG. 3 is a schematic cross-sectional diagram of an anti-peep film opened in an anti-peep mode provided by the present application.
Figure 4:
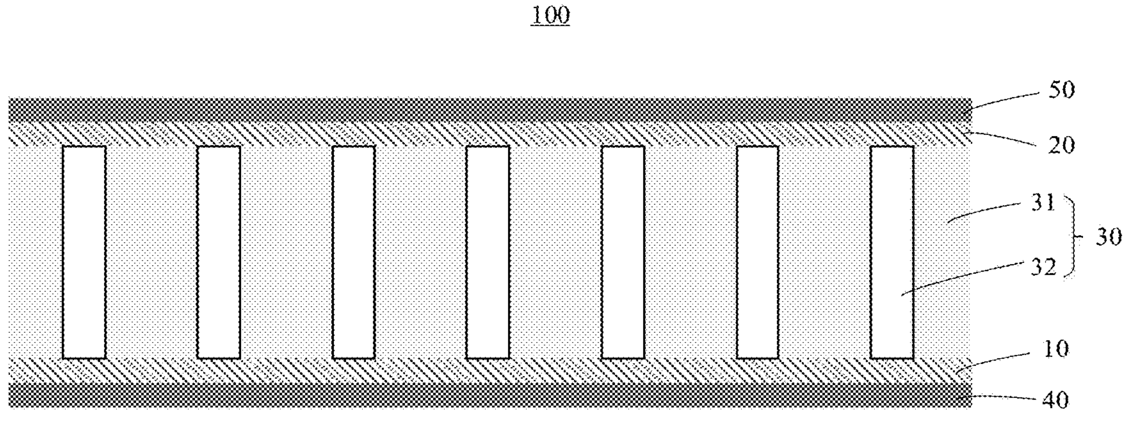
FIG. 4 is a schematic cross-sectional diagram of an anti-peep film closed in an anti-peep mode provided by the present application.

Referring to FIG. 3 and FIG. 4, the present application further provides an anti-peep film 100, and the anti-peep film 100 is an electrogenic anti-peep film.

The anti-peep film 100 includes a first electrode layer 10, a second electrode layer 20 disposed opposite to the first electrode layer 10; and an electrochromic layer 30 located between the first electrode layer 10 and the second electrode layer 20. The electrochromic layer 30 includes a substrate 31 and a plurality of electrochromic units 32 embedded in the substrate 31, and two adjacent electrochromic units 32 are separated by at least part of the substrate 31. Each of the electrochromic units 32 includes the electrochromic composition above-mentioned.

When no voltage is applied between the first electrode layer 10 and the second electrode layer 20 or a voltage difference between the first electrode layer 10 and the second electrode layer 20 is 0, the electrochromic units 32 are in the transparent state. When the voltage difference between the first electrode layer 10 and the second electrode layer 20 is greater than 0, the electrochromic units 32 are in the colored state, and the colored state includes the gray state or the black state.

Specifically, referring to FIG. 3, the anti-peep film 100 in the colored state may block the screen light with large angles, and the anti-peep mode is turned on.

Specifically, referring to FIG. 4, the anti-peep film 100 in the transparent state may allow the screen light from all angles to pass through the anti-peep film 100, and the anti-peep mode is turned off.

In an optional embodiment of the present application, a transmittance of the anti-peep film 100 decreases with the voltage difference between the first electrode layer 10 and the second electrode layer 20 increases.

In an optional embodiment of the present application, the voltage difference between the first electrode layer 10 and the second electrode layer 20 ranges from 0V to 5V. Furthermore, the voltage difference between the first electrode layer 10 and the second electrode layer 20 ranges from 0V to 1.8V.

In an optional embodiment of the present application, a thickness of the electrochromic layer 30 ranges from 100 μm to 150 μm.

Specifically, a material of the substrate 31 is transparent resin, which is used to separate and protect the adjacent electrochromic units 32.

Specifically, two ends of each of the electrochromic units 32 in a stacking direction of the first electrode layer 10, the electrochromic layer 30, and the second electrode layer 20 are in contact with the first electrode layer 10 and the second electrode layer 20, respectively. The first electrode layer 10 and the second electrode layer 20 cooperate with the substrate 31 to seal the electrochromic units 32.

In this embodiment, a plurality of electrochromic units 32 are arranged in the substrate 31 in a shutter shape. In other embodiments, an arrangement of the plurality of electrochromic units 32 is not limited the shutter shape, but may be arranged in other arrays or non-arrays.

Referring to FIG. 3 and FIG. 4 again, the anti-peep film 100 further includes a first substrate layer 40 and a second substrate layer 50. The first electrode layer 10 is located between the electrochromic layer 30 and the first substrate layer 40. The second electrode layer 20 is located between the electrochromic layer 30 and the second substrate layer 50.

The first electrode layer 10, the second electrode layer 20, the substrate 31, the first substrate layer 40, and the second substrate layer 50 are all made of transparent materials.

The first substrate layer 40 is used to support the first electrode layer 10, the electrochromic layer 30, and the second electrode layer 20. The second substrate layer 50 is used to protect the second electrode layer 20.

Figure 5:
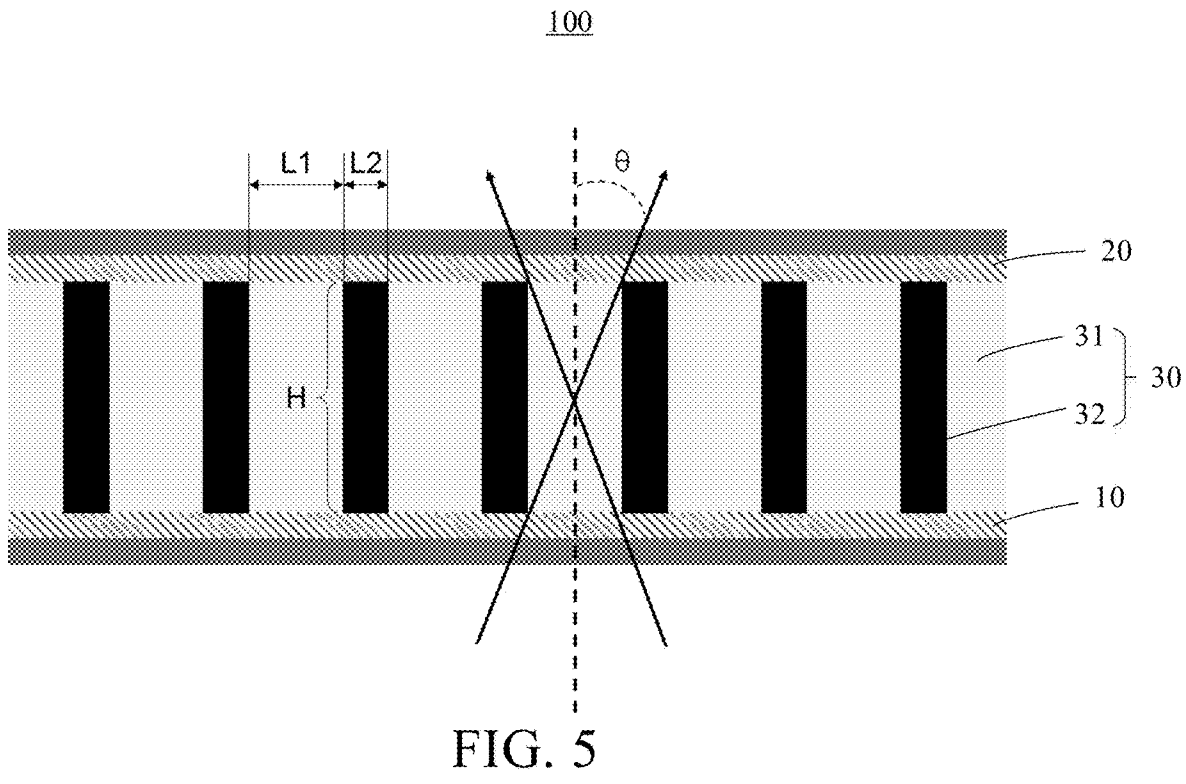
FIG. 5 is a schematic diagram of an optical path with a minimum viewing angle of the anti-peep film provided by the present application.

Referring to FIG. 5, in an optional embodiment of the present application, a minimum visible angle of light passing through the anti-peep film 100 is defined as θ, and tan θ=L1/H. L1 is a distance between the two adjacent electrochromic units 32, and H is the thickness of each of the electrochromic units 32 in the stacking direction of the first electrode layer 10, the electrochromic layer 30, and the second electrode layer 20.

In this embodiment, θ is 25°, H=150 μm, L2=70 μm, and tan θ=1.47.

L2 is a width in an arrangement direction of the plurality of electrochromic units 32. In this embodiment, L2=35 μm. Certainly, θ, L1, L2, and H is not limited to 25°, L1 is not limited to 150 μm, L2 is not limited to 70 μm, and H is not limited to 35 μm.

Figure 6:
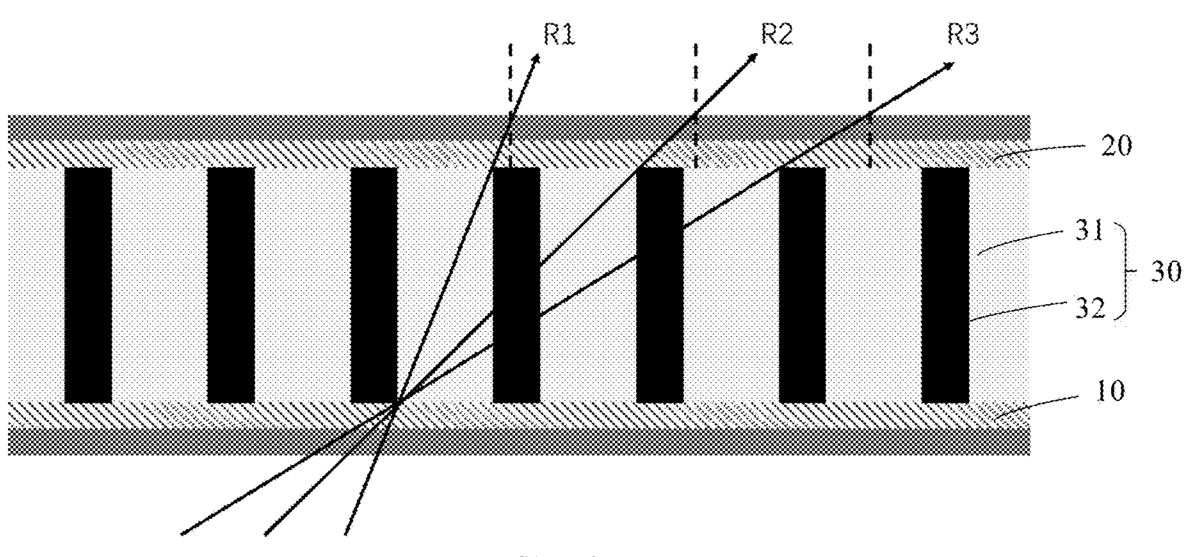
FIG. 6 is a schematic diagram of a view-adjustable optical path of the anti-peep film provided by the present application.

Referring to FIG. 6, three beams of light R1, R2, and R3 represent light from the screen seen under different viewing angles. When in the applied voltage state, the greater a number of the electrochromic units 32 through which the light with a larger viewing angle passes, the lower the light transmittance. By changing the applied voltage, a color (transparent or colored) of the electrochromic units may be changed, and the light transmittance of the anti-peep film 100 may be changed, thereby realizing the adjustment of the viewing angle.

In an optional embodiment of the present application, the visible angle, θ, of light passing through the anti-peep film 100 ranges from 0° to 15°. In this embodiment, the visible angle of the light passing through the anti-peep film 100 θ ranges from 25° to 90°.

Figure 7:
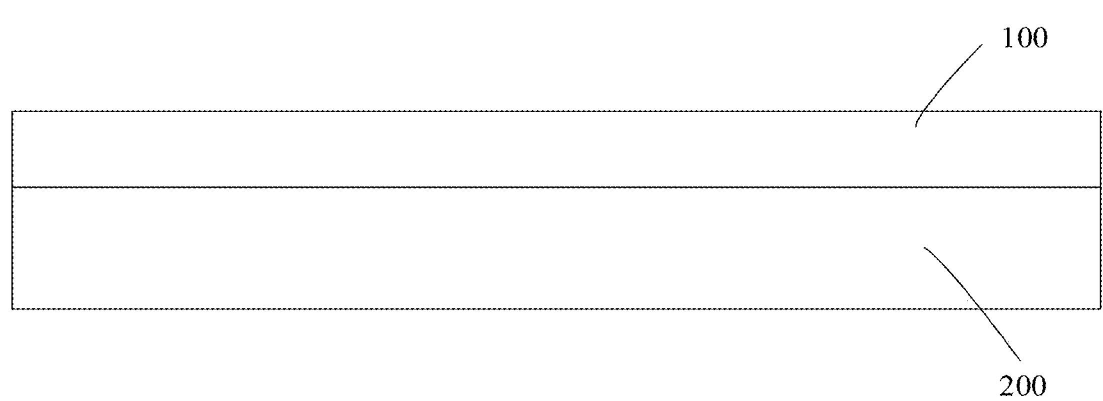
FIG. 7 is a module schematic diagram of a display device provided by some embodiments of the present application.

Referring to FIG. 7, the present application further provides a display device 1000. The display device 1000 includes a display panel 200. The display device 1000 further includes the anti-peep film 100 mentioned-above, and the anti-peep film 10θ is located on a light-emitting side of the display panel 200.

The display device 1000 may be an electronic device having a display function such as a display screen, a mobile phone, a computer, a laptop, an ipad, a computer, or the like.

The electrochromic composition provided by the present application includes the acid-sensitive dye, the electrogenic acid, the ionic liquid, and the solvent. When the voltage is applied, the electrogenic acid receives external electrons to take place a redox reaction and releases protons into the electrochromic composition. The acid-sensitive dye contacts with the protons to take place a color development reaction, so that the electrochromic composition switches from the transparent state to the colored state (the gray state or the black state). The light transmittance of the electrochromic composition in the transparent state is higher, and the light transmittance of the electrochromic composition in the colored state is lower. When the electrochromic composition is applied in the anti-peep film, the voltage difference between the first electrode layer and the second electrode layer of the anti-peep film is controlled, so that the electrochromic layer in the anti-peep film may be controlled to switch between the colored state and the transparent state to control opening and closing of an anti-peep mode of the anti-peep film. Specifically, the anti-peep film in the colored state may block screen light with a large angle, and the anti-peep mode is turned on. The anti-peep film in the transparent state may allow the screen light from all angles to pass through the anti-peep film, and the anti-peep mode is turned off. In addition, for the anti-peep film in the present application, because the voltage is applied by controlling the voltage difference between the first electrode layer and the second electrode layer of the anti-peep film, so that the electrochromic composition of the anti-peep film is controlled to switch between the transparent state and the colored state to control the opening and closing of the anti-peep mode. Therefore, it is not necessary to add a PDLC functional layer above the anti-peep film and a collimating prism film on a backlight module, so as to achieve a simple structure and lower cost.

In addition, the transparent polymer such as polymethyl methacrylate is further added in the electrochromic composition. The transparent polymer may be used as the polymer skeleton for preventing the acid-sensitive dye from agglomerating under the action of an applied electric field, resulting in that the part of agglomerated acid-sensitive dye molecules are unable to fade and generate the black particles, so as to improve the anti-peep effect.

In addition, the ratio of transparent polymer and the solvent is adjusted to adjust the viscosity of the electrochromic composition, so as to keep the electrochromic composition in the sol state. In the sol state, the acid-sensitive dye molecules, the electrogenic acid molecules, and the protons may realize long-distance migration under the action of the molecular thermal movement, so that the electrochromic composition may realize electrochromic response under the high film thickness, and the anti-peep film is capable of achieving better anti-peep effect under the high film thickness.

In addition, the greater a number of the electrochromic units through which the light with a larger viewing angle passes, the lower the light transmittance. Therefore, by changing the applied voltage of the anti-peep film in the present application to change the light transmittance of the anti-peep film, the adjustment of the viewing angle is realized.

The embodiments of the present application are described in detail above, but the above-described preferred embodiments are not intended to limit the present application. Persons of ordinary skill in the art can make modifications in terms of the specific embodiments and description according to the ideas of the present disclosure. Therefore, the content of this specification shall not be construed as a limit to the present

What is claimed is:

1. An electrochromic composition, comprising:

an acid-sensitive dye capable of switching between a transparent state and a colored state in accordance with a change of proton concentration in the electrochromic composition;

an electrogenic acid capable of producing protons under an action of external electrons applied by a voltage;

an ionic liquid composed of dissociated ions; and a solvent;

wherein the acid-sensitive dye, the electrogenic acid, the ionic liquid, and the solvent are mixed together; when the proton concentration of the electrochromic composition is 0, the acid-sensitive dye is in the transparent state; and, when the proton concentration of the electrochromic composition is greater than 0, the acid-sensitive dye is in a colored state.

2. The electrochromic composition according to claim 1, wherein in the electrochromic composition, a ratio by mass of the acid-sensitive dye, the electrogenic acid, the ionic liquid, and the solvent is (0.1~2):(0.1~2):(2~10):(40~85).

3. The electrochromic composition according to claim 1, further comprising a transparent polymer, wherein the transparent polymer, the acid-sensitive dye, the electrogenic acid, the solvent, and the ionic liquid are mixed together.

4. The electrochromic composition according to claim 3, wherein in the electrochromic composition, a mass fraction ratio of the acid-sensitive dye, the electrogenic acid, the ionic liquid, the transparent polymer, and the solvent is (0.1~2):(0.1~2):(2~10):(5~50):(40~85).

5. The electrochromic composition according to claim 1, wherein the electrochromic composition is in a sol state.

6. The electrochromic composition according to claim 5, wherein in the electrochromic composition, the solvent accounts for more than 30% by mass of the composition.

7. The electrochromic composition according to claim 1, wherein the acid-sensitive dye is a fluorane derivative.

8. The electrochromic composition according to claim 1, wherein the electrogenic acid is at least one of hydroquinone and hydroquinone derivatives, benzoquinone and benzoquinone derivatives, and urea derivatives.

9. The electrochromic composition according to claim 1, wherein the ionic liquid is a molten salt, and the molten salt is a salt that is in a molten state above 0 degrees Celsius; and the ionic liquid is at least one of trifluoromethane sulfonimide, 1-butyl-3-methylimidazole tetrafluoroborate, and 1-butyl-3-methylimidazole hexafluorophosphate.

10. The electrochromic composition according to claim 1, wherein the solvent is polycarbonate or acetonitrile.

11. The electrochromic composition according to claim 3, wherein the transparent polymer is polymethyl methacrylate or polyvinyl butyral ester.

12. The electrochromic composition according to claim 1, wherein the colored state is a gray state or a black state, a light transmittance of the electrochromic composition in the transparent state is greater than a light transmittance of the electrochromic composition in the gray state, and the light transmittance of the electrochromic composition in the gray state is greater than a light transmittance of the electrochromic composition in the black state.

13. An anti-peep film, comprising:

a first electrode layer;

a second electrode layer disposed opposite to the first electrode layer; and an electrochromic layer located between the first electrode layer and the second electrode layer;

wherein the electrochromic layer comprises a substrate and a plurality of electrochromic units embedded in the substrate, and two adjacent electrochromic units are separated by at least a part of the substrate; and, each of the plurality of electrochromic units comprises an electrochromic composition, and the electrochromic composition comprises:

an acid-sensitive dye capable of switching between a transparent state and a colored state in accordance with a change of proton concentration in the electrochromic composition;

an electrogenic acid capable of producing protons under an action of external electrons applied by a voltage;

an ionic liquid composed of dissociated ions; and a solvent;

wherein the acid-sensitive dye, the electrogenic acid, the ionic liquid, and the solvent are mixed together; and, when the proton concentration of the electrochromic composition is 0, the acid-sensitive dye is in the transparent state; and, when the proton concentration of the electrochromic composition is greater than 0, the acid-sensitive dye is in a colored state.

14. The anti-peep film according to claim 13, further comprising:

a first substrate layer located on a side of the first electrode layer away from the electrochromic layer; and a second substrate layer located on a side of the second electrode layer away from the electrochromic layer;

wherein the first electrode layer, the second electrode layer, the substrate, the first substrate layer, and the second substrate layer are all transparent.

15. The anti-peep film according to claim 13, wherein when no voltage is applied between the first electrode layer and the second electrode layer, or a voltage difference between the first electrode layer and the second electrode layer is 0, the electrochromic units are in the transparent state; and, when the voltage difference between the first electrode layer and the second electrode layer is greater than 0, the electrochromic units are in the colored state, and the colored state comprises a gray state or a black state.

16. The anti-peep film according to claim 15, wherein the voltage difference between the first electrode layer and the second electrode layer ranges from 0 V to 5V.

17. The anti-peep film according to claim 16, wherein a transmittance of the anti-peep film decreases with the voltage difference between the first electrode layer and the second electrode layer increases.

18. The anti-peep film according to claim 13, wherein a thickness of each of the electrochromic units in a stacking direction of the first electrode layer, the electrochromic layer, and the second electrode layer ranges from 100 μm to 150 μm.

19. The anti-peep film according to claim 13, wherein a minimum visible angle of light passing through the anti-peep film is defined as θ, and $\tan\theta = L1/H$;

L1 is a distance between the two adjacent electrochromic units, H is the thickness of each of the electrochromic units in the stacking direction of the first electrode layer, the electrochromic layer, and the second electrode layer;

the minimum visible angle θ of the light passing through the anti-peep film ranges from 0° to 90°.

20. A display device, comprising a display panel and an anti-peep film located on a light-emitting side of the display panel; wherein the anti-peep film comprises:

a first electrode layer;

a second electrode layer disposed opposite to the first electrode layer; and an electrochromic layer located between the first electrode layer and the second electrode layer;

wherein the electrochromic layer comprises a substrate and a plurality of electrochromic units embedded in the substrate, and two adjacent electrochromic units are separated by at least a part of the substrate; and, each of the plurality of electrochromic units comprises an electrochromic composition, and the electrochromic composition comprises:

an acid-sensitive dye capable of switching between a transparent state and a colored state in accordance with a change of proton concentration in the electrochromic composition;

an electrogenic acid capable of producing protons under an action of external electrons applied by a voltage;

an ionic liquid composed of dissociated ions; and a solvent;

wherein the acid-sensitive dye, the electrogenic acid, the ionic liquid, and the solvent are mixed together; when the proton concentration of the electrochromic composition is 0, the acid-sensitive dye is in the transparent state; and, when the proton concentration of the electrochromic composition is greater than 0, the acid-sensitive dye is in a colored state.

* * * * *